(12) United States Patent
Chun et al.

(10) Patent No.: US 8,111,764 B2
(45) Date of Patent: Feb. 7, 2012

(54) METHOD FOR TRANSMITTING CHANNEL QUALITY INFORMATION

(75) Inventors: Jin Young Chun, Anyang-si (KR); Bin Chul Ihm, Anyang-si (KR); Jae Won Chang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 398 days.

(21) Appl. No.: 12/311,280

(22) PCT Filed: Nov. 2, 2007

(86) PCT No.: PCT/KR2007/005524
§ 371 (c)(1),
(2), (4) Date: Mar. 25, 2009

(87) PCT Pub. No.: WO2008/054174
PCT Pub. Date: May 8, 2008

(65) Prior Publication Data
US 2009/0316809 A1      Dec. 24, 2009

(30) Foreign Application Priority Data
Nov. 3, 2006    (KR) .................... 10-2006-0108202

(51) Int. Cl.
*H04B 3/46* (2006.01)
*H04B 17/00* (2006.01)
*H04L 27/28* (2006.01)

(52) U.S. Cl. .................. 375/260; 375/227; 370/252
(58) Field of Classification Search ............... 375/227, 375/260, 267; 370/252
See application file for complete search history.

(56) References Cited

U.S. PATENT DOCUMENTS

| 7,885,202 B2 * | 2/2011 | Li et al. ...................... 370/252 |
| 2004/0110473 A1 | 6/2004 | Rudolf et al. |
| 2008/0101407 A1 * | 5/2008 | Khan et al. ................. 370/468 |
| 2009/0028260 A1 * | 1/2009 | Xiao et al. .................. 375/260 |
| 2011/0064153 A1 * | 3/2011 | Khan ........................... 375/260 |

FOREIGN PATENT DOCUMENTS

| KR | 10-2003-0068749 A | 8/2003 |
| KR | 10-2005-0091573 A | 9/2005 |
| KR | 10-2005-0091582 A | 9/2005 |

* cited by examiner

*Primary Examiner* — David Lugo
(74) *Attorney, Agent, or Firm* — McKenna Long & Aldridge LLP

(57) ABSTRACT

There is provided a method for transmitting channel quality information in a wireless communication system. Over-all band of the wireless communication system is divided by a plurality of sub-bands. The method includes selecting a first sub-band having the highest CQI among the plurality of sub-bands, transmitting CQI of the first sub-band and transmitting CQI of a second sub-band, the second sub-band having the CQI lower than the first sub-band, wherein the number of CQI levels of the second sub-band is less than that of CQI levels of the first sub-band. Overheads incurred by CQI feedback can be reduced.

8 Claims, 3 Drawing Sheets

[Fig. 1]
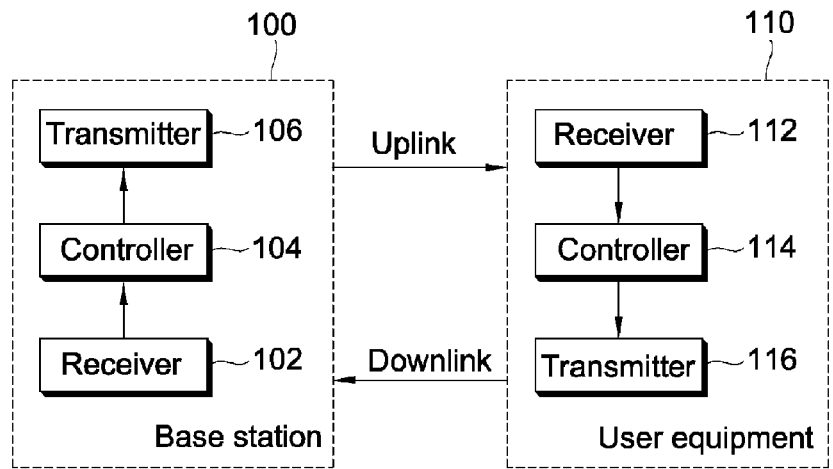
[Fig. 2]
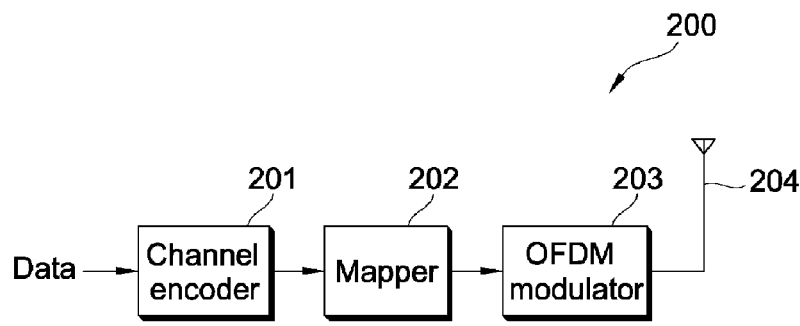
[Fig. 3]
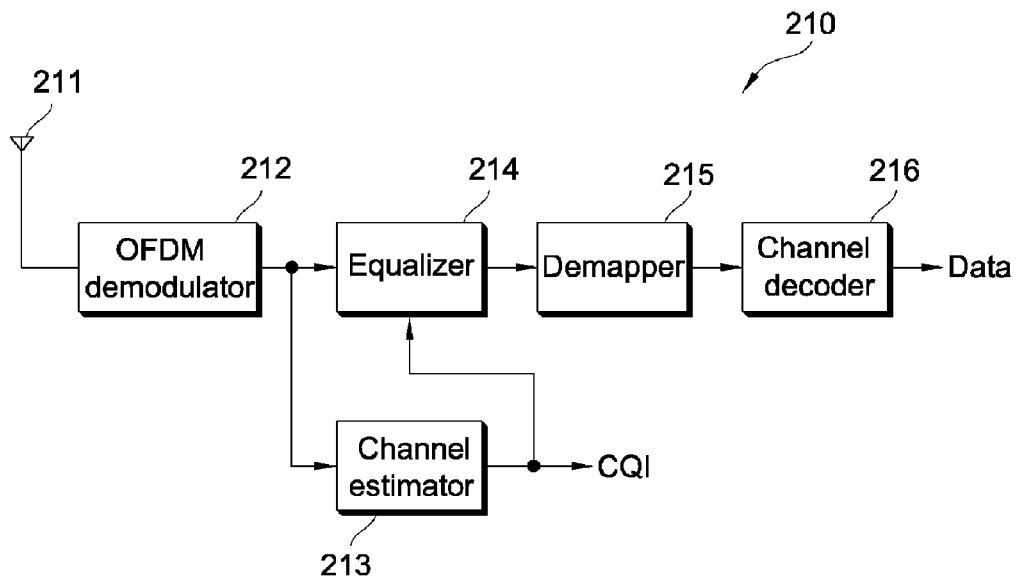

[Fig. 4]
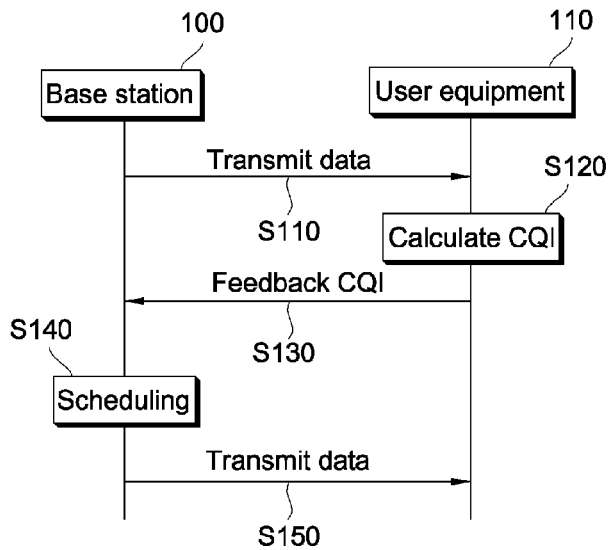
[Fig. 5]
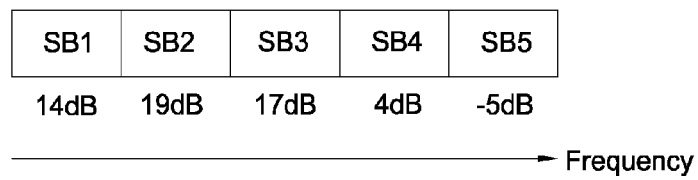
[Fig. 6]
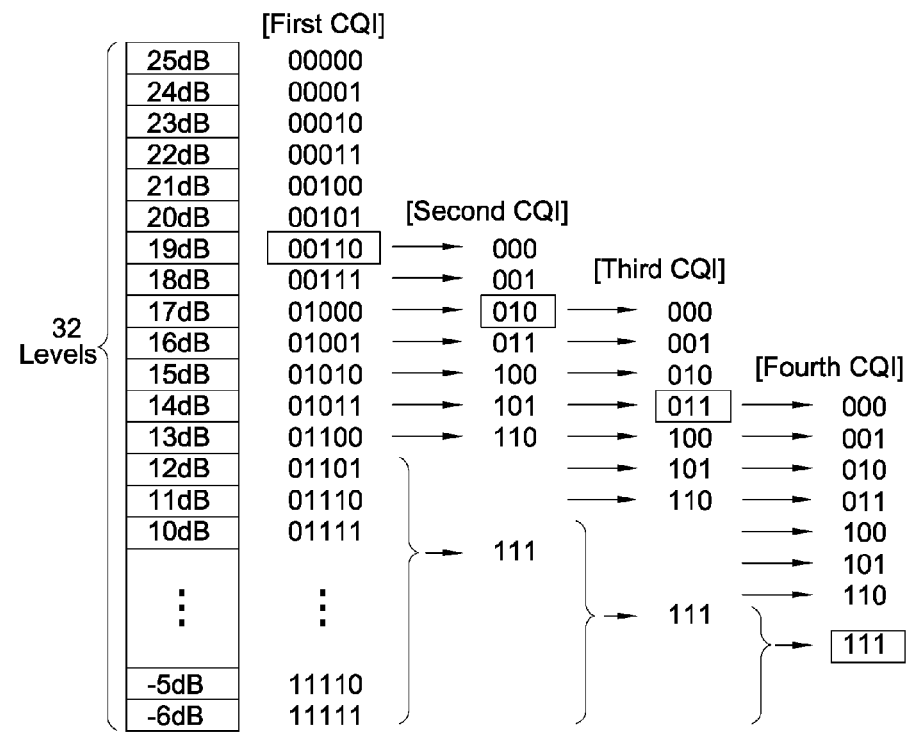

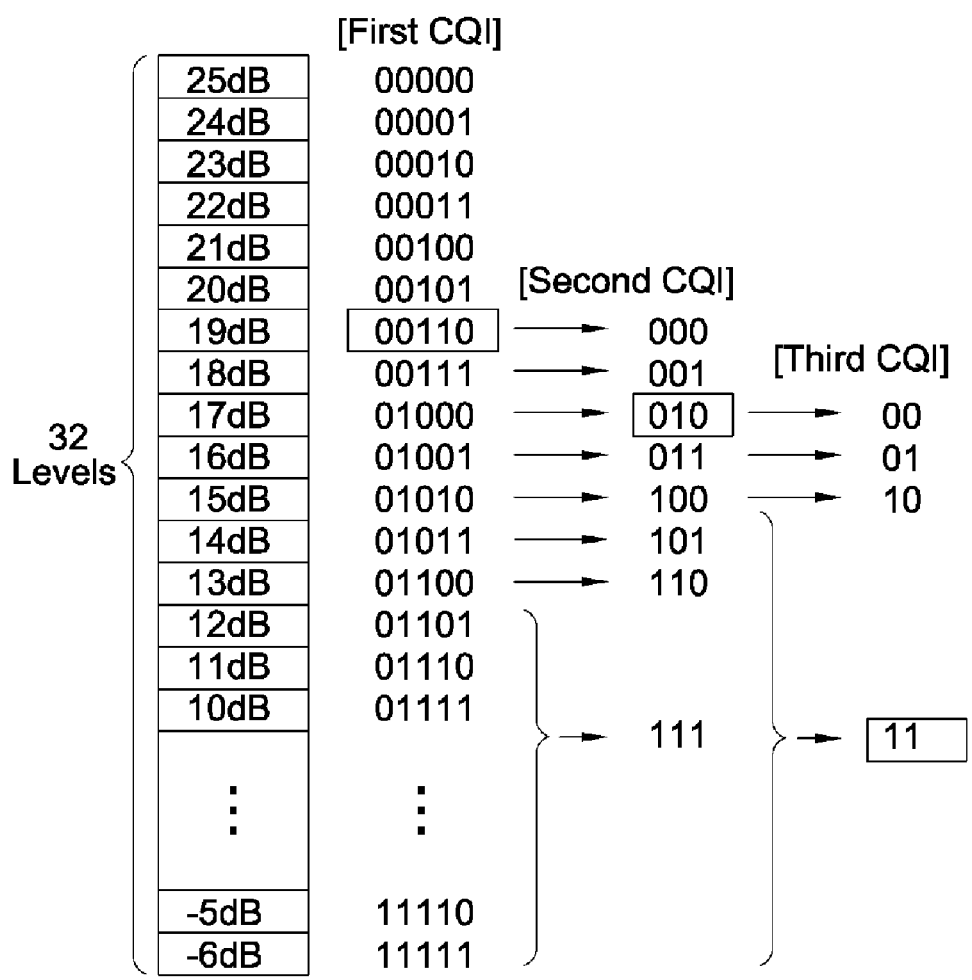
[Fig. 7]

METHOD FOR TRANSMITTING CHANNEL QUALITY INFORMATION

This application claims the benefit of PCT/KR2007/005524 filed on Nov. 2, 2007, and Korean Patent Application No. 10-2006-0108202 filed on Nov. 3, 2006, the contents of which are hereby incorporated herein by reference for all purposes in their entirety.

TECHNICAL FIELD

The present invention relates to wireless communication, and more specifically, to a method for transmitting channel quality information in a wireless communication system.

BACKGROUND ART

A variety of methods for transmitting high-quality and high-volume data using limited radio resources has been appeared in the current wireless communication systems. In addition, a closed-loop system for providing a feedback channel from a user equipment to a base station is spotlighted as a means for improving system performance.

If the user equipment provides channel information to the base station, the base station adjusts a variety of system parameters, such as a power level, transmission format, and the like, using the provided channel information to maximize the system performance. For example, an adaptive modulation and coding (AMC) technique is a technique performed by the base station to enhance link performance by adjusting a modulation and coding scheme using feedback channel information. If channel status is favorable, a data transmission rate is increased, whereas if the channel is degraded, the data transmission rate is decreased, thereby supporting efficient transmission and increasing an average transmission rate as a result.

Hereinafter, a downlink means a communication from the base station to the user equipment, and an uplink means a communication from the user equipment to the base station.

In order to efficiently transmit downlink data from the base station to the user equipment, the base station needs to allocate best resources to each user equipment. In order to allow the base station to allocate appropriate resources to the user equipment, channel quality information (hereinafter, referred to as a CQI) is needed.

Generally, a CQI is measured at the user equipment and fed back from the user equipment to the base station through an uplink channel. However, overheads are frequently occurred by the feedback of the CQI. Particularly, in a system using multiple carriers, such as an orthogonal frequency division multiplexing (OFDM) system, since a CQI of each carrier can be different from those of the others, the user equipment transmits a CQI for each carrier. However, in this case, feedback of CQIs may invite waste of uplink resources and decreases uplink capacity as a result.

Accordingly, a method of efficiently transmitting CQIs while reducing overheads incurred by CQI feedback is required.

DISCLOSURE OF INVENTION

Technical Problem

It is an object of the invention to provide a method for reducing overheads incurred by CQI feedback.

Technical Solution

In an aspect, there is provided a method for transmitting channel quality information in a wireless communication system. Overall band of the wireless communication system is divided by a plurality of sub-bands. The method includes selecting a first sub-band having the highest CQI among the plurality of sub-bands, transmitting CQI of the first sub-band and transmitting CQI of a second sub-band, the second sub-band having the CQI lower than the first sub-band, wherein the number of CQI levels of the second sub-band is less than that of CQI levels of the first sub-band.

In another aspect, there is provided a method for enabling a user equipment to transmit channel quality information to a base station. The method includes transmitting CQI for a first sub-band and transmitting CQI for a second sub-band, wherein the number of CQI levels of the second sub-band is different from that of CQI levels of the first sub-band.

ADVANTAGEOUS EFFECTS

Overheads incurred by CQI feedback can be reduced by transmitting CQIs having a different number of CQI levels among a plurality of sub-bands. In addition, CQI feedback is suspended for a sub-band having channel quality below a certain level, and thus degradation in uplink capacity incurred by the feedback can be prevented.

BRIEF DESCRIPTION OF THE DRAWINGS

FIG. 1 is a block diagram showing a communication system according to an embodiment of the present invention.

FIG. 2 is a block diagram showing a transmitter according to an embodiment of the invention.

FIG. 3 is a block diagram showing a receiver according to an embodiment of the invention.

FIG. 4 is a flowchart illustrating communications between a base station and a user equipment.

FIG. 5 is an exemplary view showing frequency bandwidth.

FIG. 6 is an exemplary view showing a method for transmitting CQI according to an embodiment of the invention.

FIG. 7 is an exemplary view showing a method for transmitting CQI according to another embodiment of the invention.

MODE FOR THE INVENTION

FIG. 1 is a block diagram showing a communication system according to an embodiment of the present invention.

Referring to FIG. 1, a communication system comprises a base station (BS) 100 and a user equipment (UE) 110. The communication system is widely deployed to provide a variety of communication services, such as voices, packets, data, and the like. The base station 100 generally is a fixed station that communicates with the user equipment 110 and can be referred to as another terminology, such as an evolved-NodeB (eNB), base transceiver system (BTS), access point, or the like. The user equipment 110 can be fixed or mobile and referred to as another terminology, such as a mobile station (MS), user terminal (UT), subscriber station (SS), wireless device, or the like.

The base station 100 includes a receiver 102, a controller 104, and a transmitter 106. The receiver 102 receives channel quality information (CQI), as well as data, through an uplink channel. The controller 104 can schedule a transmission format, power level, transmission rate, and the like of the transmitter 106 based on the received CQI. The transmitter 106 processes data using the determined transmission format, power level, transmission rate, and the like and transmits the data to the user equipment 110 through a downlink channel.

The base station 100 allocates best resources to the user equipment 110 based on the fed back CQI to enhance data transmission performance.

The user equipment 110 includes a receiver 112, a controller 114, and a transmitter 116. The receiver 112 receives data through the downlink channel. The data may contain a pilot signal or a preamble for measuring a CQI. The receiver 112 measures a CQI through the information contained in the data. The controller 114 schedules the measured CQI following a channel feedback method. The transmitter 116 transmits the scheduled CQI to the base station 100 through the uplink channel.

FIG. 2 is a block diagram showing a transmitter according to an embodiment of the invention.

Referring to FIG. 2, a transmitter 200 includes a channel encoder 201, a mapper 202, and an OFDM modulator 203. The transmitter 200 can be the transmitter 105 of the base station 100 or the transmitter 116 of the user equipment 110.

The channel encoder 201 encodes input data in a predetermined coding scheme and forms coded data. The mapper 202 modulates the coded data in a predetermined modulation scheme and maps the modulated data to symbols representing locations with respect to amplitude and phase constellation. The OFDM modulator 203 can transform input symbols into time space samples by performing fast Fourier transform (IFFT) on the input symbols. A cyclic prefix can be added to the transformed time space samples. The OFDM symbols outputted from the OFDM modulator 203 are transmitted through the antenna 204.

FIG. 3 is a block diagram showing a receiver according to an embodiment of the invention.

Referring to FIG. 3, the receiver 210 includes an OFDM demodulator 212, a channel estimator 213, an equalizer 214, a demapper 215, and a channel decoder 216. The receiver 210 can be the receiver 102 of the base station 100 or the receiver 112 of the user equipment 110.

Signals received through the receiving antenna 211 are transformed into symbols of frequency space by the OFDM demodulator 212. The OFDM demodulator 220 can remove the CP from the input signals and perform fast Fourier transform (FFT). The channel estimator 213 estimates channel quality from the received signals. The channel estimation can be performed by the controller 114 of the user equipment 110, as well as the channel estimator 213. The equalizer 214 equalizes output symbols of the OFDM demodulator 212 through channel estimation and transmits the equalized symbols to the demapper 215. The demapper 215 and the channel decoder 216 perform an inverse process of the signal processing technique performed by the channel encoder 201 and the mapper 202 of the transmitter 200.

The transmitter 200 and the receiver 210 have been described with respect to single-input single-output (SISO) having one transmission antenna and one receiving antenna. However, the technical arts of the present invention can be applied to a multiple-input multiple-output (MIMO) system as they are.

The transmitter 200 and the receiver 210 have been described with respect to an orthogonal frequency division multiplexing (OFDM)/orthogonal frequency division multiple access (OFDMA) method. However, the present invention is not limited to this, but the technical arts of the present invention can be applied to other radio access methods, such as time division multiple access (TDMA), code division multiple access (CDMA), or the like, as well as a method using multiple carriers, as they are.

FIG. 4 is a flowchart illustrating communications between a base station and a user equipment.

Referring to FIG. 4, the base station 100 transmits data to the user equipment S110. The data may contain a pilot signal or a preamble for measuring a CQI. The user equipment 110 calculates a CQI for each frequency band S120.

Here, the CQI is information on downlink channel status reported by the user equipment 110 to the base station 100 so that the base station 100 may allocated downlink resources to the user equipment 110. The CQI may be a variety of forms, such as signal-to-interference plus noise ratio (SINR), modulation and coding scheme (MCS) level, data rate indicator, received signal strength indicator, and the like. The controller 114 of the user equipment 110 can process the CQI in the variety of forms using channel quality provided by the channel estimator. Hereinafter, a CQI is transmitted in the form of a SINR to further clarify descriptions.

The user equipment 110 feeds back a CQI having a different number of CQI levels among respective sub-bands to the base station 100 as described below S130. The base station 100 schedules a transmission format, power level, transmission rate, or the like based on the received CQI S140, processes data based on the determined transmission format, power level, transmission rate, or the like, and transmits the processed data to the user equipment 110 S150.

Hereinafter, a channel quality information feedback method according to an embodiment of the present invention is described.

FIG. 5 is an exemplary view showing frequency bandwidth.

Referring to FIG. 5, overall bandwidth is divided into a plurality of sub-bands SB1, SB2, SB3, SB4, and SB5. The overall bandwidth can be bandwidth of a system. 'n' of 'SBn' represents the index of the sub-band. The overall bandwidth is divided into five sub-bands in the figure. However, the present invention is not limited to this, but the overall bandwidth can be divided into five or more or five or less sub-bands. In a system using multiple sub-carriers, a sub-band can be a group comprising a plurality of sub-carriers.

A CQI is calculated for each of the sub-bands. That is, the CQI is not calculated for all sub-carriers, but only one CQI is calculated per group. The CQI is not calculated for each sub-carrier but is calculated for a certain group of sub-carriers, and thus overheads incurred by feedback are reduced.

After calculating a CQI for each sub-band, the sub-bands are sorted based on a sub-band having the best CQI. For example, as shown in FIG. 5, it is assumed that CQI values measured from the leftmost sub-band toward the right are 14 dB, 19 dB, 17 dB, 4 dB, and −5 dB in order. In this case, a reference sub-band that becomes a reference is the sub-band SB2 having the highest CQI value of 19 dB. The reference sub-band is referred to as a first sub-band. Next, in order of higher CQIs, the sub-band having a CQI value of 17 dB SB3 becomes a second sub-band, the sub-band having a CQI value of 14 dB SB1 becomes a third sub-band, the sub-band having a CQI value of 4 dB SB4 becomes a fourth sub-band, and lastly, the sub-band having a CQI value of −5 dB SB5 becomes a fifth sub-band.

Hereinafter, a CQI fed back for the first sub-band becomes a reference CQI and is referred to as a first CQI. A CQI fed back for the second sub-band is referred to as a second CQI, a CQI fed back for the third sub-band is referred to as a third CQI, a CQI fed back for the fourth sub-band is referred to as a fourth CQI, and a CQI fed back for the fifth sub-band is referred to as a fifth CQI.

FIG. 6 is an exemplary view showing a method for transmitting CQI according to an embodiment of the invention.

Referring to FIG. 6, the first CQI is a CQI fed back for a first sub-band. The first CQI is in the form of a CQI level, and a full CQI value is transmitted as the first CQI. The full CQI value means that it is not a value difference.

Since the first sub-band has the best channel quality, it is configured to have the most CQI levels. A CQI level is a level representing a CQI, and the larger the number of bits is, the more number of CQI levels can be expressed.

It is assumed that a CQI level uses five bits to report the first CQI. In this case, the number of CQI levels is $2^5=32$, and a CQI of 32 levels can be expressed. CQI level '00000' represents a CQI value of 25 dB, CQI level '00001' represents a CQI value of 24 dB, and CQI level '00010' represents a CQI value of 23 dB. This is merely an example, and CQI levels and corresponding CQI values can be diversely modified depending on a system. For another example, it is possible to represent the highest CQI value as CQI level '11111'.

Since the CQI value of the reference sub-band is 19 dB, the first CQI value is '00110' of a CQI level corresponding to 19 dB. '00110' is fed back to the base station as the first CQI. A full value, not a value difference, is fed back as a value of the first CQI.

Subsequently, from the second CQI after the first CQI, a CQI can be expressed with less number of levels than that of the first CQI. For example, from the second CQI, a CQI can be calculated to include only a certain range of levels with reference to a previous CQI. In this case, the second CQI has less CQI levels than the CQI levels of the first CQI.

In other words, the second CQI value can be calculated by subtracting the CQI value of the second sub-band from the CQI value of the first sub-band. The second CQI value is a value difference, and this value becomes a CQI fed back for the second sub-band.

In addition, the number of CQI levels representing the second CQI can be smaller than the number of CQI levels of the first CQI that becomes a reference. Since a CQI level can be said as a form of a fed back CQI, if the number of CQI levels of the second CQI is smaller than the number of CQI levels of the first CQI, the number of bits representing the CQI of the second sub-band is smaller than the number of bits representing the CQI of the first sub-band. For example, it is assumed that three bits are used to report the second CQI, which is smaller than the number of bits representing the first CQI levels. In this case, the number of CQI levels is $2^3=8$, and a CQI of eight levels can be expressed. For example, CQI level '000' has a difference of zero from a previous CQI value, CQI level '001' has a difference of one from a previous CQI value, CQI level '010' has a difference of two from a previous CQI value, and CQI level '110' has a difference of six from a previous CQI value. Since the CQI value of the second sub-band is 17 dB, it has a difference of two from the CQI of the first sub-band, and a corresponding CQI level is '010'. '010' is fed back to the base station as the second CQI.

However, the number of bits expressing the second CQI levels is not limited to three bits, but it can be two bits or four bits that are smaller than the number of bits expressing the first CQI levels.

The number of levels of the first CQI is 32, whereas the number of levels of the second CQI is only 8, and thus a second CQI value may not be expressed by a level of the allocated second CQI levels. If the CQI of the second sub-band is 10 dB, its difference from the CQI of the first sub-band of 19 dB is 9 dB, and thus the second CQI value cannot be expressed by a second CQI level. Taking this into consideration, a CQI value represents a value difference for upper seven levels of the second CQI levels, but a predetermined value is used if the second CQI value is lower than the upper seven levels. For example, if a CQI value of the second sub-band has a difference of more than (t2−1) levels from the CQI value of the first sub-band, the second CQI value is set to '111'. 't2' is the number of levels that the second CQI level can express. Here, since 't' is eight, if a CQI value has a difference of more than seven from a previous CQI value, the second CQI value becomes '111'. If the base station receives '111' as a CQI value, it regards channel quality of the corresponding sub-band as having a difference of more than (t2−1) levels from the first CQI value and processes as such.

If the level of the second CQI is '111', CQIs of subsequent sub-bands are suspended and may not be fed back to the base station. That is, if the second CQI has the lowest CQI level, CQIs of subsequent sub-bands are not fed back. It is since that the CQIs are sorted in descending order, and thus the CQI of the third sub-band will have a difference of more than (t2−1) from the CQI of the first sub-band.

CQIs of sub-bands having a difference of more than a certain value from the CQI of the reference sub-band are not reported to the base station. CQIs of sub-bands having channel quality lower than a requested level may not need to be reported since channel quality is low and thus a transmission error is highly probable to occur. The CQIs are not reported since the object of feeding back the CQIs is scheduling of the base station and it is efficient to select a sub-band having a high CQI for scheduling. CQIs are reported only for the sub-bands having channel quality higher than a certain level, and thus overheads incurred by feedback are reduced.

From the second CQI, the number of levels of a CQI can be appropriately adjusted depending on requested minimum channel quality. In the present invention, overheads incurred by feedback are reduced by gradually decreasing the number of levels of each CQI that is fed back for each sub-band.

The number of levels of a CQI of a sub-band can be diversely set. In an embodiment, the number of bits representing different CQI levels can be transmitted from the base station to the user equipment. In another embodiment, the base station transmits a setting value for requested channel quality to the user equipment, and the user equipment can adjust the number of bits for representing different CQI levels.

Although the number of bits representing CQI levels of each sub-band can be fixed, it can be adaptively adjusted depending on channel status.

On the other hand, the third CQI value is calculated by subtracting the CQI value of the third sub-band from the CQI value of the second sub-band. The third CQI value is a value difference, and this value becomes a CQI fed back for the third sub-band.

The number of CQI levels representing the third CQI can be smaller than the number of CQI levels of the first CQI that becomes a reference. For example, it is assumed that three bits are used to report the third CQI. In this case, the number of CQI levels is $2^3=8$, and a CQI of eight levels can be expressed. Since the CQI value of the third sub-band is 14 dB, it has a difference of three from the CQI of the second sub-band, and a corresponding CQI level is '011'. '011' is fed back to the base station as the third CQI. In the same manner as the second CQI value, a CQI value represents a value difference for upper seven levels of the third CQI levels, but a predetermined value is used if the third CQI value is lower than the upper seven levels. If the third CQI has the predetermined value, CQIs of subsequent sub-bands are suspended and may not be fed back to the base station.

The fourth CQI value is calculated by subtracting the CQI value of the fourth sub-band from the CQI value of the third sub-band. The fourth CQI value is a value difference, and this value becomes a CQI fed back for the fourth sub-band.

The number of CQI levels representing the fourth CQI can be smaller than the number of CQI levels of the first CQI that becomes a reference. For example, it is assumed that three bits are used to report the fourth CQI. In this case, the number of CQI levels is $2^3=8$, and a CQI of eight levels can be expressed. Since the CQI value of the fourth sub-band is 4 dB, it has a difference of ten from the CQI of the third sub-band, and a corresponding CQI level is '111'. '111' is fed back to the base station as the fourth CQI. In the same manner as the second CQI value, a CQI value represents a value difference for upper seven levels of the fourth CQI levels, but a predetermined value is used if the fourth CQI value is lower than the upper seven levels. If the fourth CQI has the predetermined value, CQIs of subsequent sub-bands are suspended and may not be fed back to the base station.

Since a previously determined value (the lowest CQI level) is transmitted as the fourth CQI that is fed back for the fourth sub-band, the CQI of the subsequent fifth sub-band is not transmitted. The fifth sub-band is highly probable not to be suitable as a downlink channel, and the base station can select an appropriate sub-band and determine a power level, a transmission rate, or the like considering the relation with other user equipments about the received CQIs of the first to fourth sub-bands.

Hereinafter, the effect of the channel quality information feedback method according to the present invention is qualitatively described.

The number of bits M needed for generally transmitting CQIs for all sub-bands is as shown MathFigure 1

$$M = (k+m) \times N \times \frac{1}{r}$$ [Math. 1]

where k denotes the number of bits for representing N sub-bands, m the number of bits for representing CQI levels is m and r a code rate.

It is assumed that there are five sub-bands, k is three ($2^3=8$), m is five ($2^5=32$) to express 32 levels, and a code rate r is ⅙. In this case, the number of bits actually needed is M=(3+5)× 5×6=240 bits.

If, as shown in the embodiment of FIG. 6, 32 CQI levels are used for the first sub-band and 8 CQI levels are used for the other four sub-bands, the number of bits actually needed is M={(3+5)+(3+3)×4}×6=192 bits. Performance has been improved by about 20%. This is an example including a CQI for the fifth sub-band. If the CQI for the fifth sub-band lower than the reference CQI is not fed back, the number of needed bits is M={(3+5)+(3+3)×3}×6=156 bits. Performance has been improved by about 35%.

In the present invention, a full CQI value is transmitted as the first CQI, but only a value difference is fed back as the second or later CQI. Overheads incurred by feedback are reduced by decreasing the number of fed back bits. In addition, CQIs having channel quality lower than a set value are excluded from a scheduling value, and thus unnecessary scheduling can be avoided.

FIG. 7 is an exemplary view showing a method for transmitting CQI according to another embodiment of the invention.

Referring to FIG. 7, unlike the embodiment of FIG. 6, the number of bits representing a CQI level is gradually decreased as a sub-band has lower channel quality. That is, as sub-bands have lower channel quality, the number of CQI levels is gradually decreased.

First, as shown in FIG. 5, it is assumed that CQI values measured from the leftmost sub-band toward the right are 14 dB, 19 dB, 17 dB, 4 dB, and −5 dB in order. In this case, a reference sub-band that becomes a reference is the sub-band SB2 having the highest CQI value of 19 dB. The reference sub-band is referred to as a first sub-frequency. Next, in order of high CQIs, the sub-band having a CQI value of 17 dB SB3 becomes a second sub-band, the sub-band having a CQI value of 14 dB SB1 becomes a third sub-band, the sub-band having a CQI value of 4 dB SB4 becomes a fourth sub-band, and lastly, the sub-band having a CQI value of −5 dB SB5 becomes a fifth sub-band.

The first CQI is a CQI fed back for the first sub-band. A full CQI value is transmitted as the first CQI. In this case, the number of CQI levels is $2^5=32$, and a CQI of 32 levels can be expressed. A CQI level is an index known to both the base station and the user equipment for specifying a CQI value. Since the CQI value of the reference sub-band is 19 dB, the first CQI value is '00110' of a CQI level corresponding to 19 dB. '00110' is fed back to the base station as the first CQI.

Subsequently, from the second CQI after the first CQI, a CQI is calculated by subtracting a CQI value from a pervious CQI value in order. The second CQI value is calculated by subtracting the CQI value of the second sub-band from the CQI value of the first sub-band. The second CQI value is a value difference, and this value becomes a CQI fed back for the second sub-band.

The number of CQI levels representing the second CQI can be smaller than the number of CQI levels 't' of the first CQI that becomes a reference. That is, the number of bits representing the CQI of the second sub-band can be smaller than the number of bits representing the CQI of the first sub-band. For example, it is assumed that three bits are used to report the second CQI. In this case, the number of CQI levels is $2^3=8$, and a CQI of eight levels can be expressed. Since the CQI value of the second sub-band is 17 dB, it has a difference of two from the CQI of the first sub-band, and a corresponding CQI level is '010'. '010' is fed back to the base station as the second CQI.

The third CQI value is calculated by subtracting the CQI value of the third sub-band from the CQI value of the second sub-band. The third CQI value is a value difference, and this value becomes a CQI fed back for the third sub-band. The number of CQI levels representing the third CQI can be smaller than the number of CQI levels of a previous CQI. That is, the number of CQI levels can be decreased for a CQI of a sub-band that is fed back further later. It is since that as the CQI is lowered, a range of the CQI that the base station can select is narrowed.

For example, it is assumed that two bits are used to report the third CQI. In this case, the number of CQI levels is $2^2=4$, and a CQI of four levels can be expressed. Since the CQI value of the third sub-band is 14 dB, it has a difference of three from the CQI of the second sub-band, and a corresponding CQI level is '11'. '11' is fed back to the base station as the third CQI. A CQI value represents a value difference for upper three levels of the third CQI levels, but a predetermined value is used if the third CQI value is lower than the upper three levels. That is, if a CQI value of the third sub-band has a difference of more than (t3−1) levels from the CQI value of the second sub-band, the third CQI value is set to '11'. Here, 't3' is the number of levels that the third CQI level can express. If the level of the third CQI is '11', CQIs of subsequent sub-bands are suspended and may not be fed back to the base station.

Accordingly, CQIs are not fed back for the fourth and fifth sub-bands. That is, since the lowest CQI level is transmitted as the third CQI that is fed back for the third sub-band, CQIs of the subsequent fourth and later sub-bands are not transmitted.

The number of CQI levels of a sub-band is decreased as channel quality is lowered, and if a CQI is out of the allocated number of CQI levels, a predetermined value is fed back, and feedback of CQIs of subsequent sub-bands is suspended. Accordingly, overheads incurred by feedback can be reduced.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method for transmitting channel quality information (CQI) in a wireless communication system, overall band of the wireless communication system divided by a plurality of sub-bands, the method comprising:
   selecting a first sub-band having the highest CQI among the plurality of sub-bands;
   transmitting CQI of the first sub-band;
   transmitting CQI of a second sub-band, the second sub-band having the CQI lower than the first sub-band, wherein the number of CQI levels of the second sub-band is less than that of CQI levels of the first sub-band; and
   transmitting CQI of a third sub-band, the third sub-band having the CQI lower than the second sub-band, wherein the number of CQI levels of the third sub-band is less than that of CQI levels of the second sub-band.

2. The method according to claim 1, wherein the CQI of the second sub-band is a value difference with respect to the CQI of the first sub-band.

3. The method according to claim 1, wherein the CQI of the third sub-band is a value difference with respect to the CQI of the second sub-band.

4. The method according to claim 1, wherein the CQI of the second sub-band is set to a same value when the CQI of the second sub-band is out of a certain range.

5. An apparatus for transmitting channel quality information (CQI) in a wireless communication system, overall band of the wireless communication system divided by a plurality of sub-bands, the apparatus comprising:
   a receiver;
   a transmitter; and
   a controller operatively coupled with the receiver and the transmitter and configured to:
   select a first sub-band having the highest CQI among the plurality of sub-bands;
   transmit CQI of the first sub-band;
   transmit CQI of a second sub-band, the second sub-band having the CQI lower than the first sub-band, wherein the number of CQI levels of the second sub-band is less than that of CQI levels of the first sub-band; and
   transmit CQI of a third sub-band, the third sub-band having the CQI lower than the second sub-band, wherein the number of CQI levels of the third sub-band is less than that of CQI levels of the second sub-band.

6. The apparatus according to claim 5, wherein the CQI of the second sub-band is a value difference with respect to the CQI of the first sub-band.

7. The apparatus according to claim 5, wherein the CQI of the third sub-band is a value difference with respect to the CQI of the second sub-band.

8. The apparatus according to claim 5, wherein the CQI of the second sub-band is set to a same value when the CQI of the second sub-band is out of a certain range.

* * * * *